(12) United States Patent
Feng et al.

(10) Patent No.: US 9,694,450 B1
(45) Date of Patent: Jul. 4, 2017

(54) METHOD FOR MANUFACTURING PISTON WITH RE-MOLTEN REINFORCED COMBUSTION CHAMBER THROAT

(71) Applicant: SHANDONG BINZHOU BOHAI PISTON CO., LTD., Binzhou, Shandong (CN)

(72) Inventors: Zengjian Feng, Shandong (CN); Shiying Liu, Shandong (CN); Zihe Shang, Shandong (CN); Longchang Wang, Shandong (CN); Yanjun Li, Shandong (CN); Yanshou Cui, Shandong (CN); Yunxin Li, Shandong (CN); Xinghua Geng, Shandong (CN); Shili Wang, Shandong (CN); Zhaojie Pang, Shandong (CN); Tateoki Iizuka, Shandong (CN)

(73) Assignee: SHANDONG BINZHOU BOHAI PISTON CO., LTD., Binzhou, Shandong (CN)

( * ) Notice: Subject to any disclaimer, the term of this patent is extended or adjusted under 35 U.S.C. 154(b) by 0 days.

(21) Appl. No.: 15/309,640

(22) PCT Filed: Jan. 29, 2015

(86) PCT No.: PCT/CN2015/071805
§ 371 (c)(1),
(2) Date: Nov. 8, 2016

(87) PCT Pub. No.: WO2015/188631
PCT Pub. Date: Dec. 17, 2015

(30) Foreign Application Priority Data

Jun. 10, 2014 (CN) .......................... 2014 1 0255788

(51) Int. Cl.
*C22C 47/04* (2006.01)
*B23P 15/10* (2006.01)
(Continued)

(52) U.S. Cl.
CPC .............. *B23P 15/10* (2013.01); *B23K 9/167* (2013.01); *C21D 1/09* (2013.01); *C22F 1/00* (2013.01); *F02F 3/00* (2013.01); *B23K 2201/003* (2013.01)

(58) Field of Classification Search
CPC ... B23P 15/10; B23K 9/167; B23K 2201/003; C22F 1/00; F02F 3/00; C21D 1/09
See application file for complete search history.

(56) References Cited

FOREIGN PATENT DOCUMENTS

| CN | 102268670 A | 12/2011 |
|---|---|---|
| CN | 104028984 A | 9/2014 |

(Continued)

OTHER PUBLICATIONS

International Search Report for PCT/CN2015/071805, mailed Mar. 11, 2015, ISA/CN.
(Continued)

*Primary Examiner* — Ryan J Walters
(74) *Attorney, Agent, or Firm* — Yue Xu; U.S. Fairsky LLP

(57) ABSTRACT

A method for manufacturing a piston with a re-molten reinforced combustion chamber throat is provided. The manufacturing steps includes: a) piston rough machining: machining allowances of the combustion chamber throat and the combustion chamber bottom are 1-3 mm; b) piston washing and degreasing treatment; c) coating or spraying a surfactant on the combustion chamber throat and the combustion chamber bottom that need to be re-molten, wherein the surfactant formula comprises the components $TiO_2$, $SiO_2$, $CuCl_2$ and $MnCl_2$ that are mixed in percentage: 1-30%

(Continued)

of $TiO_2$, 1-30% of $SiO_2$, 1-40% of $CuCl_2$ and 1-50% of $MnCl_2$; after the four components are uniformly mixed, a suspension is prepared by using acetone as a solvent a mass ratio of 1:(3-8); d) re-melting the piston by using an A-TIG welding method; and f) after re-melting, processing the piston into a finished product.

3 Claims, 8 Drawing Sheets

(51) Int. Cl.
| | | |
|---|---|---|
| *B23K 9/167* | (2006.01) | |
| *C21D 1/09* | (2006.01) | |
| *C22F 1/00* | (2006.01) | |
| *F02F 3/00* | (2006.01) | |
| *B23K 101/00* | (2006.01) | |

(56) References Cited

FOREIGN PATENT DOCUMENTS

| JP | H0386387 A | 4/1991 |
|---|---|---|
| JP | H0517899 A | 1/1993 |
| KR | 20020052247 A | 7/2002 |
| WO | 2014012826 A1 | 1/2014 |

OTHER PUBLICATIONS

Zhou, Zejie et al. Effects of Activating Fluxes on DC A-TIG Welding of 2003 Aluminum Alloy, Hot Working Technology, 2013,vol. 42,No. 11, pp. 168-171, Jun. 2013.

METHOD FOR MANUFACTURING PISTON WITH RE-MOLTEN REINFORCED COMBUSTION CHAMBER THROAT

This application is a National Phase entry of PCT Application No. PCT/CN2015/071805, filed Jan. 29, 2015, which claims the benefit of priority to Chinese Patent Application No. 201410255788.0 titled "METHOD FOR MANUFACTURING PISTON WITH RE-MOLTEN REINFORCED COMBUSTION CHAMBER THROAT", filed with the Chinese State Intellectual Property Office on Jun. 10, 2014, the entire disclosure of which are incorporated herein by reference.

FIELD

The present application relates to a method for manufacturing a piston with a re-molten reinforced combustion chamber throat.

BACKGROUND

Currently, engines of heavy trucks, engineering machinery, railway locomotives and marine are all developed towards high power and high load, and the reinforcement degree is continuously improved, and emission requirements are more and more stringent. That a ceramic composite material is added into a head of a piston of an engine can improve thermal fatigue property of a throat of the piston, however, the ceramic composite material has a relatively high cost, which is not suitable for large-scale production and application. Traditional TIG welding technique, which is tungsten inert gas welding with an English abbreviation of TIG (Tungsten Inert Gas Welding) welding, cannot meet requirements for manufacturing a piston with a re-molten reinforced combustion chamber throat.

SUMMARY

An object of the present application is to overcome the above deficiencies in the conventional technology, which provides a method for manufacturing a piston with a re-molten reinforced combustion chamber throat for reinforcing weak parts such as a combustion chamber throat and a combustion chamber bottom of the piston.

To achieve the above objects, a following technical solution is employed in the present application.

A method for manufacturing a piston with a re-molten reinforced combustion chamber throat is provided, and the material of the piston is an aluminum alloy or a magnesium alloy. The method includes following manufacturing steps:

a) roughly machining a piston, wherein a combustion chamber throat and a combustion chamber bottom of the piston are weakest parts of the piston, and machining allowances of the combustion chamber throat and the combustion chamber bottom range from 1 mm to 3 mm;

b) washing and degreasing the piston;

c) coating or spraying a surfactant on the combustion chamber throat and the combustion chamber bottom to be re-molten, wherein the surfactant has a formulation composition including $TiO_2$, $SiO_2$, $CuCl_2$ and $MnCl_2$, and is obtained by mixing the four components in the following mass percentage:

$TiO_2$ 1-30%, $SiO_2$ 1-30%, $CuCl_2$ 1-40%, and $MnCl_2$ 1-50%, after the above four components are uniformly mixed, forming a suspension of the mixture using acetone as a solvent in a mass ratio of 1:(3-8);

d) re-melting the piston by A-TIG welding; and f) processing the piston into a finished product after the re-melting.

In step d), a specific structure of the piston re-molten by A-TIG welding includes two re-molten welding seams formed at the piston combustion chamber throat and the piston combustion chamber bottom.

In step d), a specific structure of the piston re-molten by A-TIG welding includes more than two re-molten welding seams formed at the piston combustion chamber throat and the piston combustion chamber bottom.

A re-molten reinforced structure of a piston combustion chamber throat (combustion chamber aperture) is disclosed according to the present application, in which a combustion chamber throat area is locally processed by re-molten using A-TIG argon arc welding.

An A-TIG method is a new efficient welding method, which refers to coating a thin surfactant on a surface of a sheet to be welded in order to greatly deepen the weld penetration. The re-melting is to melt an aluminum matrix by high temperature at the instant of the A-TIG argon arc welding, and the speed of the air cooling in the re-melting may just be thousands of times of the speed of cooling and solidifying in casting.

More refinement texture of alloy can be obtained by re-melting through A-TIG welding, and the microstructure of the alloy has changed significantly. Si in aluminum alloy is converted from relatively large primary crystal silicon blocks and primary crystal silicon rods into refinement primary crystal silicon blocks and eutectic crystalline silicon particles, and the refinement primary crystal silicon blocks and the eutectic crystalline silicon particles are uniformly dispersed into the Al matrix. Alloy phase in the aluminum alloy is also significantly refined. The coarser primary crystal silicon is an important factor that causes failure of the piston combustion chamber throat. In another aspect, the Al matrix is deformed by the stress effect generated in the condensation process, thus dislocation density is increased, and a cellular network structure is formed, thereby advantageously improving anti-fatigue properties of the aluminum alloy material. The micro-hardness of the re-molten zone is approximately 1.2 times to 2 times of the hardness of the body of the piston. Further, a heat affected zone (metallurgical bonding layer) exists between the reinforced layer and the matrix material, thereby a graded hardness distribution is formed between the matrix material and the reinforced layer, which facilitates improving anti-fatigue capability of the aluminum alloy material, i.e., the throat portion, and achieving the purpose of improving the fatigue life of the overall piston.

Figure 1A:
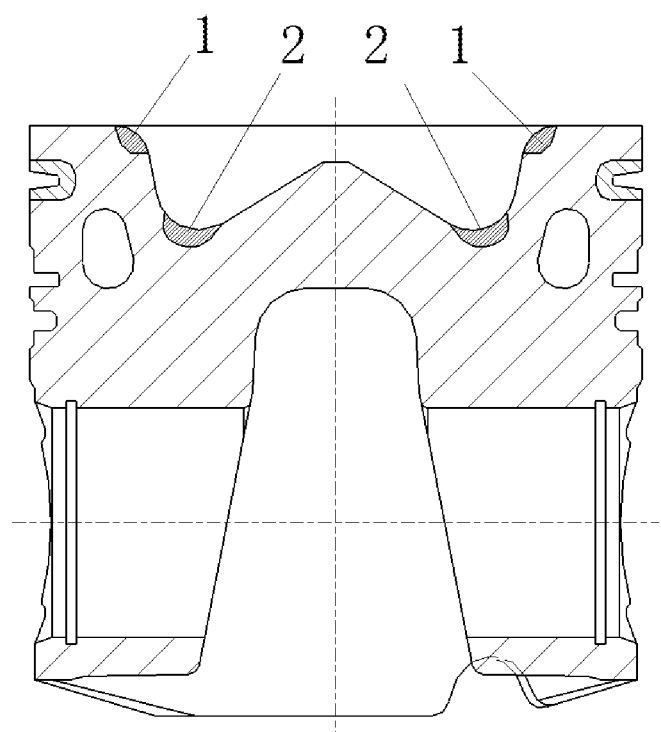
FIGS. 1(a), 1(b) are a front view and a top view showing the structure of a combustion chamber of a re-molten piston, with two welding seams being formed at a combustion chamber throat and a combustion chamber bottom of the piston.
Figure 1B:
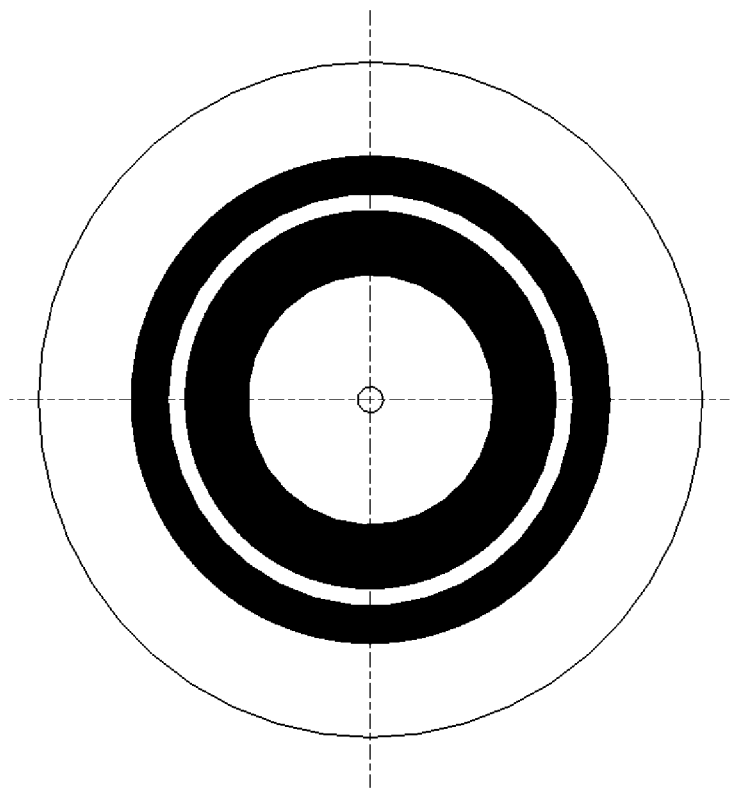
Figure 2A:
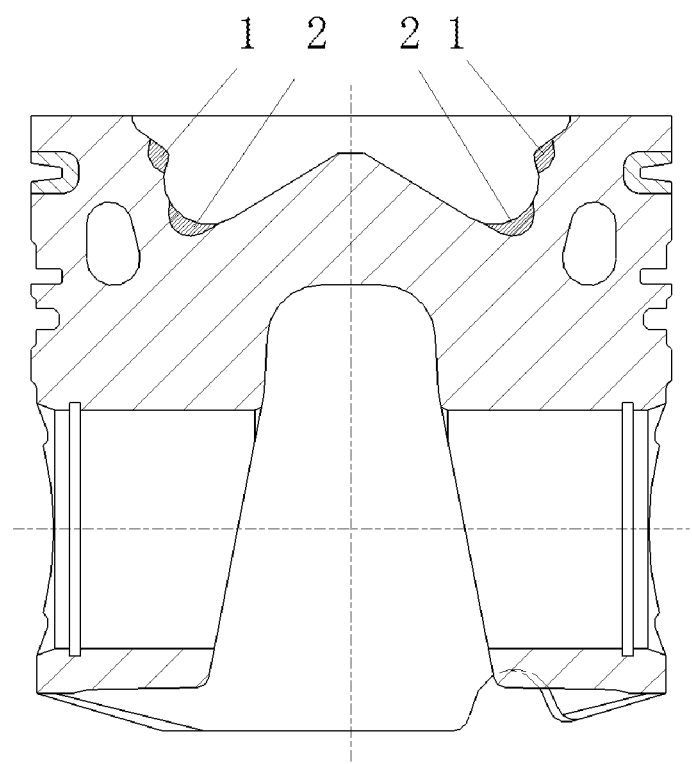
FIGS. 2(a), 2(b) are a front view and a top view showing the structure of another combustion chamber of a re-molten piston, with two welding seams being formed at a combustion chamber throat and a combustion chamber bottom of the piston.
Figure 2B:
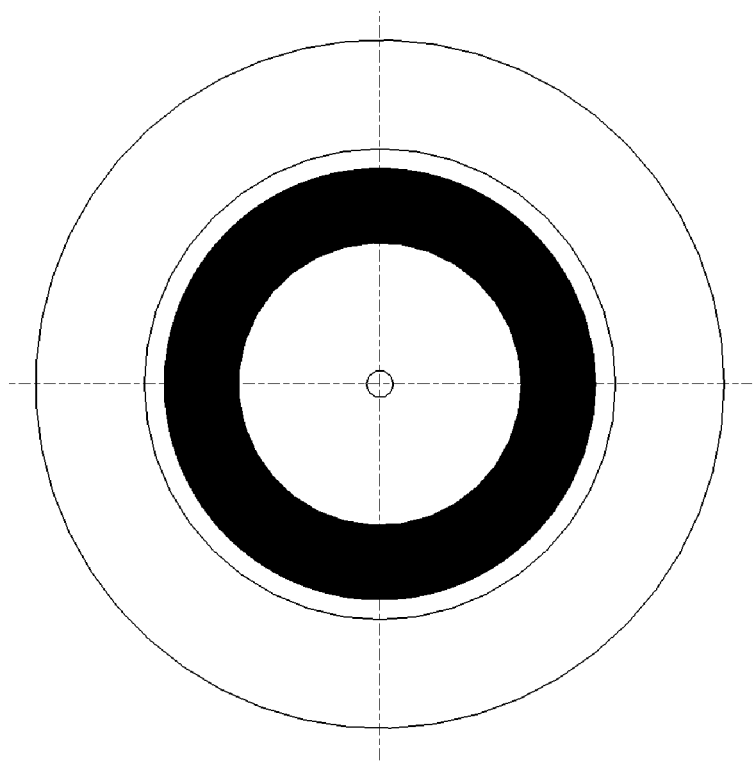
Figure 3A:
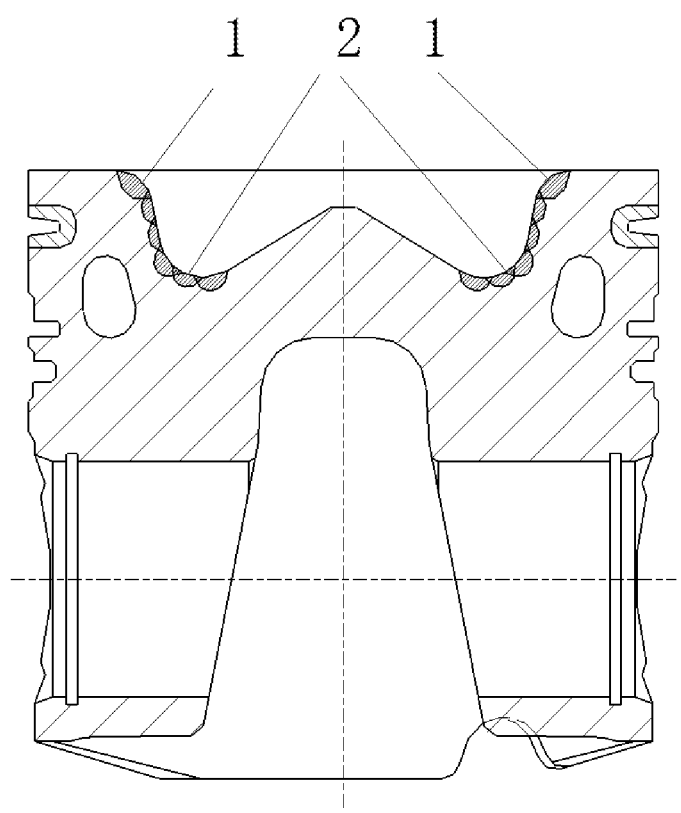
FIGS. 3(a), 3(b) are a front view and a top view showing the structure the combustion chamber of the re-molten piston which has the same shape as the structure in FIGS. 1(a), 1(b), with more than two welding seams being formed at a part from a combustion chamber throat to a combustion chamber bottom of the re-molten portion.
Figure 3B:
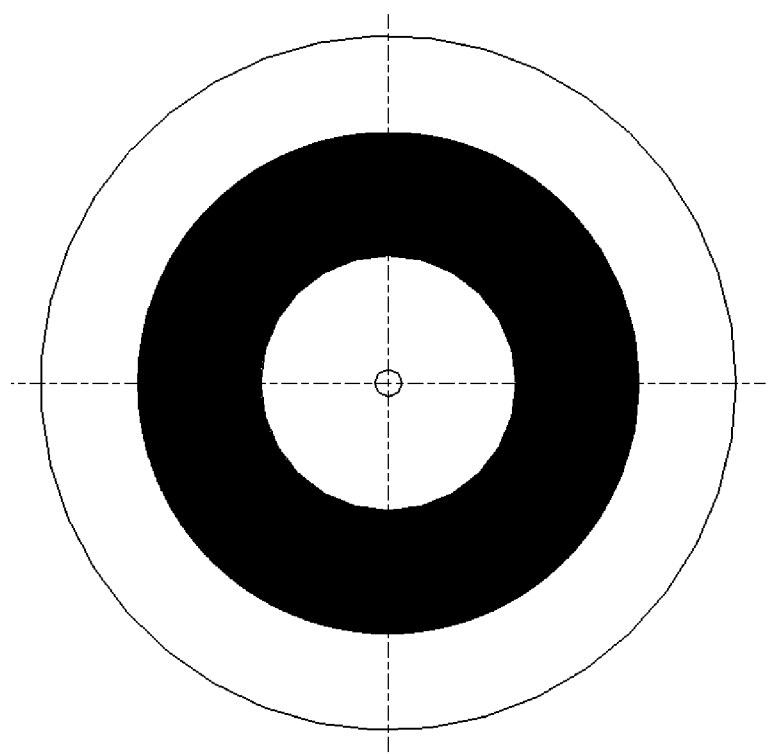
Figure 4A:
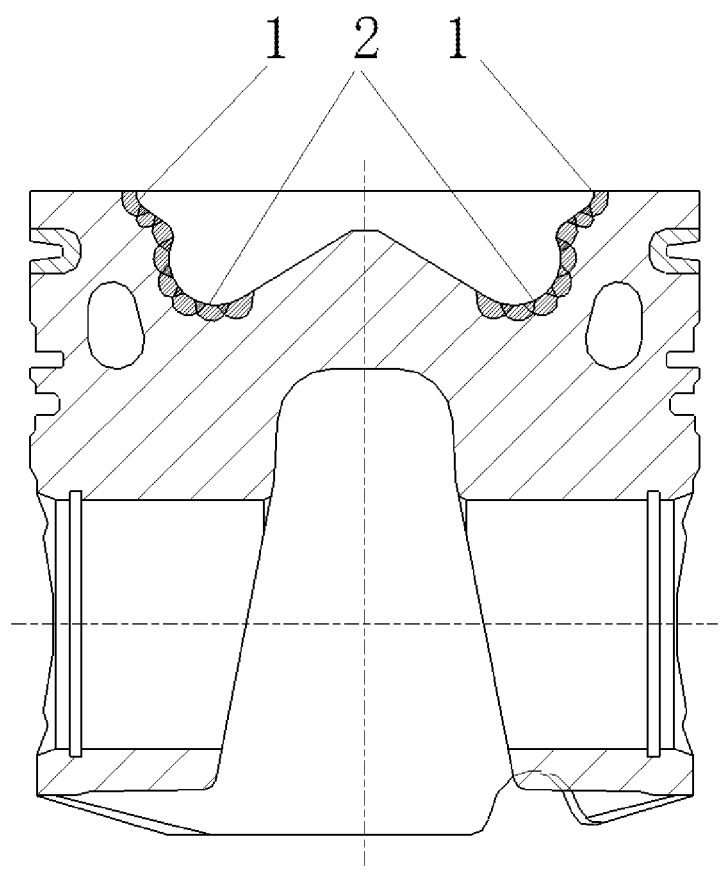
FIGS. 4(a), 4(b) are a front view and a top view showing the structure of a combustion chamber of a re-molten piston which has the same shape as the structure in FIGS. 2(a), 2(b), with more than two welding seams being formed at a part from a combustion chamber throat to a combustion chamber bottom of the re-molten portion.
Figure 4B:
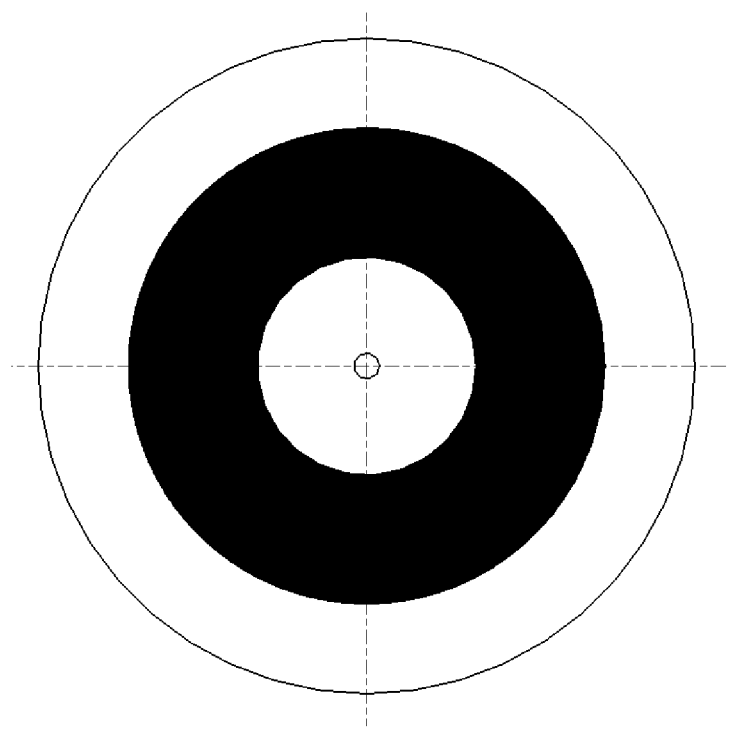

REFERENCE NUMERALS IN THE DRAWINGS 1. combustion chamber throat, and 2. combustion chamber bottom.

DETAILED DESCRIPTION

The present application is further described with reference to drawings and embodiments A method for manufacturing a piston with a re-molten reinforced combustion chamber throat is provided. The material of the piston is an aluminum alloy or a magnesium alloy. The method includes the following manufacturing steps:

a) roughly machining piston, wherein a combustion chamber throat 1 and a combustion chamber bottom 2 of the piston are weakest parts of the piston, and machining allowances of the combustion chamber throat 1 and the combustion chamber bottom 2 range from 1 mm to 3 mm;

b) washing and degreasing the piston;

c) coating or spraying a surfactant on the combustion chamber throat 1 and the combustion chamber bottom 2 to be re-molten;

wherein the surfactant has a formulation composition including $TiO_2$, $SiO_2$, $CuCl_2$ and $MnCl_2$, and is obtained by mixing the four components in the following mass percentage (mass ratio):

formulation of first embodiment
$TiO_2$ 29%;
$SiO_2$ 1%;
$CuCl_2$ 20%;
$MnCl_2$ 50%.

formulation of second embodiment
$TiO_2$ 20%;
$SiO_2$ 15%;
$CuCl_2$ 40%;
$MnCl_2$ 25%.

formulation of third embodiment
$TiO_2$ 30%;
$SiO_2$ 30%;
$CuCl_2$ 39%;
$MnCl_2$ 1%.

formulation of fourth embodiment
$TiO_2$ 19%;
$SiO_2$ 30%;
$CuCl_2$ 1%;
$MnCl_2$ 50%.

formulation of fifth embodiment
$TiO_2$ 15%;
$SiO_2$ 30%;
$CuCl_2$ 35%;
$MnCl_2$ 20%.

formulation of sixth embodiment
$TiO_2$ 1%;
$SiO_2$ 25%;
$CuCl_2$ 25%;
$MnCl_2$ 49%.

after the above four components are uniformly mixed, forming a suspension of the mixture using acetone as a solvent in a mass ratio of 1:(3-8).

d) re-melting the piston by A-TIG welding.

in step d), a specific structure of the piston re-molten by A-TIG welding includes two re-molten welding seams formed at the piston combustion chamber throat 1 and the piston combustion chamber bottom 2; or in step d), a specific structure of the piston re-molten by A-TIG welding includes more than two re-molten welding seams formed at the piston combustion chamber throat 1 and the piston combustion chamber bottom 2.

e) processing the piston into a finished product after the re-melting.

Only representative embodiments of the present application are described and presented herein, in addition to those embodiments, various variations and modifications can be made to the present application without departing from the concept and scope of the present application. For example, the method according to the present application can be utilized to make a combined piston with a head and a skirt portion separated with each other, and the head can be re-molten by A-TIG welding at the combustion chamber throat and the combustion chamber bottom.

The invention claimed is:

1. A method for manufacturing a piston with a re-molten reinforced combustion chamber throat, wherein the material of the piston is an aluminum alloy or a magnesium alloy, and the method comprises:

a) roughly machining a piston, wherein a combustion chamber throat and a combustion chamber bottom of the piston are weakest parts of the piston, and machining allowances of the combustion chamber throat and the combustion chamber bottom range from 1 mm to 3 mm;

b) washing and degreasing the piston;

c) coating or spraying a surfactant on the combustion chamber throat and the combustion chamber bottom to be re-molten, wherein,
the surfactant has a formulation composition comprising four components: $TiO_2$, $SiO_2$, $CuCl_2$ and $MnCl_2$, and is obtained by mixing the four components in the following mass percentage:
$TiO_2$ 1-30%, $SiO_2$ 1-30%, $CuCl_2$ 1-40% and $MnCl_2$ 1-50%, and
after the four components are uniformly mixed, forming a suspension of the mixture using acetone as a solvent in a mass ratio of 1:(3-8);

d) re-melting the piston by A-TIG (Argon arc welding); and e) processing the piston into a finished product after the re-melting.

2. The method according to claim 1, wherein in step d), a specific structure of the piston re-molten by A-TIG welding comprises two re-molten welding seams formed at the piston combustion chamber throat and the piston combustion chamber bottom.

3. The method according to claim 1, wherein in step d), a specific structure of the piston re-molten by A-TIG welding comprises more than two re-molten welding seams formed at the piston combustion chamber throat and the piston combustion chamber bottom.

* * * * *